T. A. HALLERAN.
TIRE PUMP FOR AUTOMOBILES.
APPLICATION FILED OCT. 5, 1916.
1,273,483.
Patented July 23, 1918.
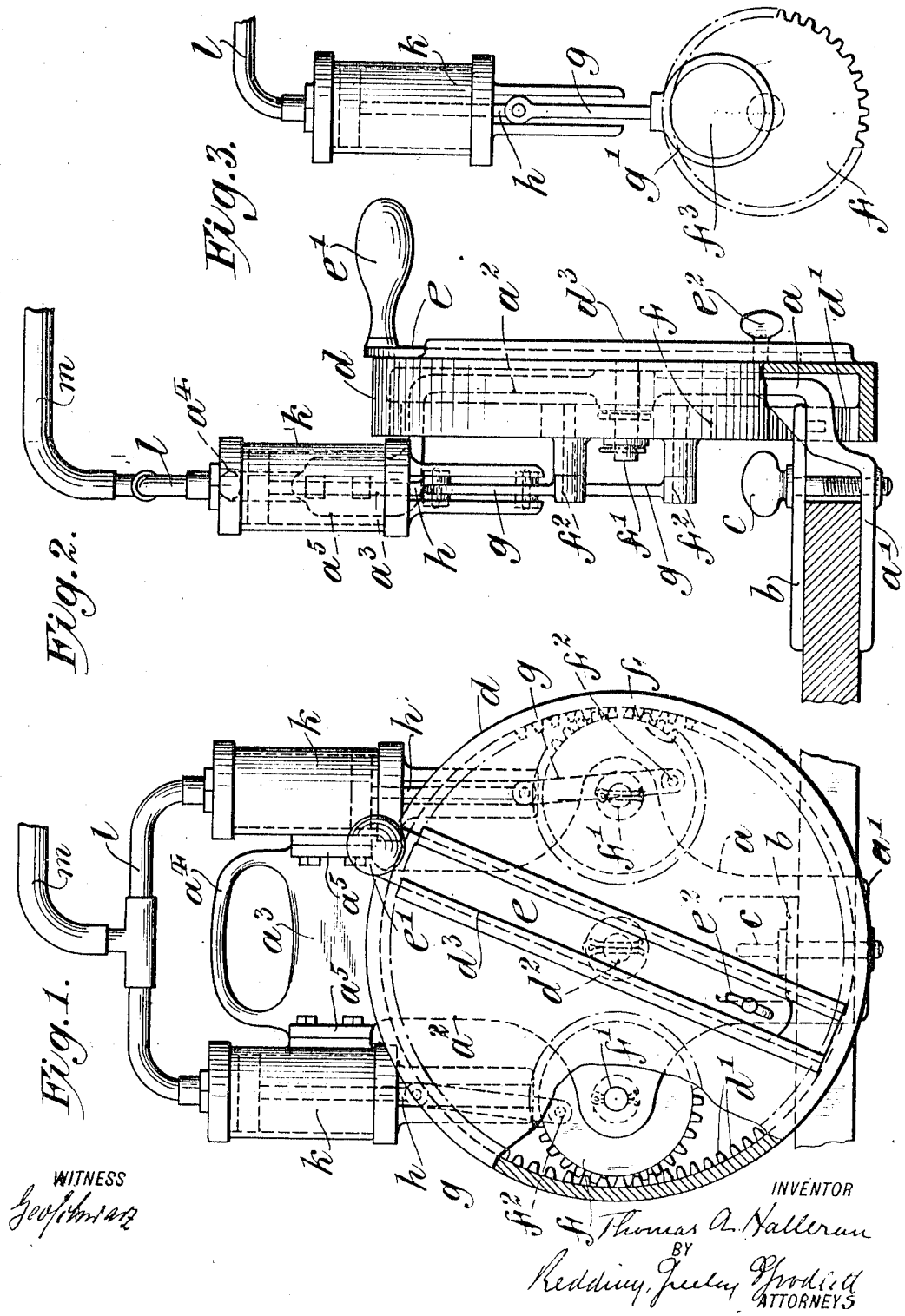

UNITED STATES PATENT OFFICE.

THOMAS A. HALLERAN, OF FLUSHING, NEW YORK.

TIRE-PUMP FOR AUTOMOBILES.

1,273,483.      Specification of Letters Patent.      Patented July 23, 1918.

Application filed October 5, 1916. Serial No. 123,814.

*To all whom it may concern:*

Be it known that I, THOMAS A. HAL-LERAN, a citizen of the United States, residing in Flushing, in the county of Queens and State of New York, have invented certain new and useful Improvements in Tire-Pumps for Automobiles, of which the following is a specification, reference being had to the accompanying drawing, forming a part hereof.

The object of this invention is to provide an improved form of hand-operated pump for inflating automobile tires on the road in which the straight line motion of the hand in the use of the ordinary hand-pump, is replaced by the much easier circular motion, while the pump itself can be secured firmly to the running board or some other convenient part of the automobile in a position which permits it to be operated with less inconvenience to the operator. Furthermore, the construction of the pump permits the pistons to be operated at a much greater speed than is possible with the usual hand pumps and the time consumed in the inflation of a tire to be correspondingly reduced with the exercise of the same degree of muscular force. In accordance with the invention the pump comprises a bracket or standard adapted to be clamped firmly to the running board or some other convenient part of the automobile, one or more pump cylinders supported by such bracket or standard, and a crank disk and gearing, also mounted on such bracket or standard, through which the reciprocation of the piston or pistons of the pump is accomplished. The invention will be more fully explained hereinafter with reference to the accompanying drawing in which it is illustrated, and in which—

Figure 1 is a view of the improved pump in side elevation, partly in section, a portion of the running board being also shown.

Fig. 2 is an edge view of the same, also partly in section.

Fig. 3 is a partial view illustrating a modified form of gearing.

A bracket or standard $a$ is provided at its lower end with means by which it can be clamped firmly upon the running board or other convenient part of the automobile, having, in the construction shown in the drawing, a foot piece $a'$, a top bar $b$ and a clamping screw $c$ which passes through the top bar and is threaded into the bottom bar or foot piece. In order that the pump may be as compact as possible and the gearing properly protected, the main portion $a^2$ of the bracket or standard is offset from the upper portion $a^3$, as clearly shown in Fig. 2, and the upper portion $a^3$ is provided with a handle $a^4$ by which the pump may be carried and preferably with vertical flanges $a^5$.

A flanged crank disk $d$ provided with internal gear teeth $d'$, is rotatably mounted, by means of a spindle $d^2$, on the standard $a$ overlapping the offset portion $a^2$ of such standard, as clearly shown in Fig. 2. On its front or outer surface the crank disk is formed with a diametrical slide-away $d^3$, in which is mounted slidably a bar $e$ which carries a crank handle $e'$ and a binding screw $e^2$ by which the crank can be held in adjusted position. Pinions $f$ are also mounted rotatably on the bracket or standard $a$, by means of spindles $f'$, respectively in mesh with the internal gear $d'$. Each of such pinions carries on its rear face a crank pin $f^2$, which is connected by a pitman $g$ with the piston rod $h$ of a corresponding pump $k$ which may be bolted to the corresponding flange $a^5$ of the standard. The delivery ends of the pump cylinders are connected by a twin coupling $l$ with the hose $m$ through which the air delivered by the pump cylinders is conducted to the tire to be inflated.

Any suitable form of gearing may be provided for the actuation of the pump pistons from the gear $d'$. In Fig. 3 the pinion $f$ is shown as having an eccentric $f^3$, the pitman $g$ being connected to an eccentric strap $g'$.

It will be observed that the dished or flanged crank disk not only carries the internal gear $d'$, but provides a cover or guard for the intermeshing gears and the crank pins, preventing injury to fingers and clothing. The pump is complete in itself, can be secured readily in position, can be operated with the minimum of discomfort and with great rapidity, is compact, and can be made amply strong without undue weight.

I claim as my invention:

1. A hand-operated tire pump for automobiles comprising a standard adapted to be secured to the automobile, a pump cylinder mounted on the standard, a crank disk carrying on one side a crank handle and having on the other side an internal gear and also mounted on the standard, a pinion mounted on the standard in engagement with said internal gear and operative connections between the pinion and the pump piston.

2. A hand-operated tire pump for automobiles comprising a standard adapted to be secured to the automobile and having its main portion offset to one side, a pump cylinder mounted on the upper portion of the standard, a flanged or dished crank disk having on one side a crank handle and on the other side an internal gear, said crank gear being mounted on the offset side portion of the standard and overlapping the same, a pinion carried by the standard in mesh with the internal gear and operative connections between the pinion and the pump piston.

This specification signed this 29th day of September A. D. 1916.

THOMAS A. HALLERAN.

Copies of this patent may be obtained for five cents each, by addressing the "Commissioner of Patents, Washington, D. C."